US012650893B2

(12) United States Patent
Adams et al.

(10) Patent No.: US 12,650,893 B2
(45) Date of Patent: Jun. 9, 2026

(54) PERSISTENT AND SELF-LEARNING DEBUG PROCESS FOR SERVER FAILURE ANALYSIS

(71) Applicant: International Business Machines Corporation, Armonk, NY (US)

(72) Inventors: Thomas North Adams, Round Rock, TX (US); Rorie Paul Reyes, Kingston, NY (US); Bryan Fernando Rangel Aguirre, Ocotlan (MX); Nimot Kareem, Hutto, TX (US)

(73) Assignee: International Business Machines Corporation, Armonk, NY (US)

( * ) Notice: Subject to any disclaimer, the term of this patent is extended or adjusted under 35 U.S.C. 154(b) by 7 days.

(21) Appl. No.: 18/773,823

(22) Filed: Jul. 16, 2024

(65) Prior Publication Data

US 2026/0023635 A1     Jan. 22, 2026

(51) Int. Cl.
*G06F 11/00*     (2006.01)
*G06F 11/07*     (2006.01)
*G06N 20/00*     (2019.01)

(52) U.S. Cl.
CPC ........ *G06F 11/079* (2013.01); *G06F 11/0766* (2013.01); *G06N 20/00* (2019.01)

(58) Field of Classification Search
CPC .............. G06F 11/079; G06F 11/0793; G06F 11/0751; G06F 11/0727; G06F 11/0787; G06N 20/00; G06N 3/08
See application file for complete search history.

(56) References Cited

U.S. PATENT DOCUMENTS 7,191,364 B2     3/2007   Hudson et al.
7,404,180 B2 *   7/2008   Wedel ................. G06F 11/3636
                                                                717/128

(Continued)

FOREIGN PATENT DOCUMENTS

CN         108446184 B     9/2021
CN         111680932 B     4/2023
EP           1405187 B1     4/2019

OTHER PUBLICATIONS

Balakrishnan et al. "PED: Proof-Guided Error Diagnosis by Triangulation of Program Error Causes", 2008 Sixth IEEE International Conference on Software Engineering and Formal Methods, Jan. 2008, pp. 268-278, DOI:10.1109/SEFM.2008.35.

(Continued)

*Primary Examiner* — Jonathan D Gibson
(74) *Attorney, Agent, or Firm* — Lily Neff

(57)     ABSTRACT

A method, computer system, and a computer program product are provided for debugging and determining root cause analysis of a server error. Resource data is obtained as relating to a server with error or debugging needs and grouped based on learned and programmed context specific components to determine a root cause analysis for the error or debugging need. An overall solution is then provided to address the server error or debugging need by evaluation a root cause analysis. The overall solution analyzes a plurality of disparate reasons causing the server error or debugging need and providing a single coherent solution based on interconnectivity of the plurality of disparate reasons. The overall solution is updated by obtaining historical data. A recommendation is then provided for the server to resolve the error or the debugging need based on the updated overall solution.

20 Claims, 5 Drawing Sheets

(56)  References Cited

U.S. PATENT DOCUMENTS

| | | | | |
|---|---|---|---|---|
| 7,509,519 | B2* | 3/2009 | Srivastava | G06F 11/0709 |
| | | | | 714/26 |
| 8,060,782 | B2 | 11/2011 | Caspi et al. | |
| 8,762,301 | B1 | 6/2014 | Buckbee, Jr. | |
| 10,120,747 | B2 | 11/2018 | Cunico et al. | |
| 10,223,236 | B2* | 3/2019 | Carey | G06F 11/366 |
| 10,761,926 | B2 | 9/2020 | Chien | |
| 10,785,090 | B2 | 9/2020 | Vasseur et al. | |
| 11,526,391 | B2 | 12/2022 | Dobos et al. | |
| 11,573,848 | B2* | 2/2023 | Linck | G06F 11/0793 |
| 12,101,220 | B2* | 9/2024 | Nedungadi | H04W 4/80 |
| 12,197,274 | B2* | 1/2025 | Revanna | G06F 11/0709 |
| 12,320,843 | B2* | 6/2025 | Becht | G06F 11/3656 |
| 2005/0120273 | A1 | 6/2005 | Hudson et al. | |
| 2014/0310692 | A1* | 10/2014 | Manuzak | G06F 11/366 |
| | | | | 717/127 |
| 2014/0372795 | A1* | 12/2014 | Graham | G06F 11/0712 |
| | | | | 714/15 |
| 2015/0121145 | A1* | 4/2015 | Mahajan | G06F 11/0778 |
| | | | | 714/37 |
| 2016/0217406 | A1 | 7/2016 | Najmi | |
| 2017/0286257 | A1* | 10/2017 | Etelson | G06F 11/362 |
| 2019/0138429 | A1* | 5/2019 | Mulder | G06F 3/067 |
| 2019/0213288 | A1* | 7/2019 | Bhowmick | G06F 30/3323 |
| 2019/0356533 | A1 | 11/2019 | Vasseur et al. | |
| 2019/0384255 | A1 | 12/2019 | Krishnaswamy et al. | |
| 2020/0201699 | A1* | 6/2020 | Yu | G06F 11/0769 |
| 2020/0218635 | A1* | 7/2020 | Komanduri | G06F 11/3612 |
| 2021/0382775 | A1 | 12/2021 | Li et al. | |
| 2022/0210003 | A1* | 6/2022 | Nedungadi | H04L 67/10 |
| 2023/0153190 | A1* | 5/2023 | Foxworth | G06F 11/079 |
| | | | | 714/48 |
| 2024/0211339 | A1* | 6/2024 | Shen | G06F 11/0793 |
| 2025/0355758 | A1* | 11/2025 | Möhler | G06F 11/079 |
| 2026/0023635 | A1* | 1/2026 | Adams | G06F 11/0709 |

OTHER PUBLICATIONS

Liu et al. "A Self-Learning Sensor Fault Detection Framework for Industry Monitoring IoT", Mathematical Problems in Engineering, Aug. 3, 2013, 9 pages, vol. 2013, Issue No. 12, DOI:10.1155/2013/712028.

Yi et al., "Explaining Software Failures by Cascade Fault Localization," ACM Transactions on Design Automation of Electronic Systems (TODAES), Jun. 24, 2015, 24 pages, vol. 20, Issue No. 3, https://doi.org/10.1145/2738038.

* cited by examiner

100

PERSISTENT AND SELF-LEARNING DEBUG PROCESS FOR SERVER FAILURE ANALYSIS

BACKGROUND

The present invention relates generally to data management and recovery and more particularly to techniques for debugging and performing failure analysis of server computers.

Large and sophisticated computing systems, whether local, remote or even part of the cloud, often comprise one or more server computers. When a server fails for various hardware or software issues, a variety of processes are conducted and associated data is collected. These may include system reset/reboot, looking at a system hang, collecting data dump, or reviewing function failures. Most of error analysis, however, depends on collecting and reviewing error logs. An error log is typically recorded to provide the user with additional information about the failure as well as document the failure event.

In many instances, however, error reporting is typically performed in a vacuum. In other words, each event is treated separately and as unrelated to surrounding events regardless of any potential underlying connections or events happening within the same time frame. Errors can be promoted to a higher level at times by a threshold mechanism, but this does not consider user actions or changes to the system as part of the debug process. Root cause analysis is time-consuming and expensive and may result in important parts being replaced as part of the process due to issues with error reporting.

SUMMARY

Embodiments of the present invention disclose a method, computer system, and a computer program product for debugging and determining root cause analysis of a server error. Resource data is obtained related to a server. Resource data is obtained as relating to the server. The server either has a debugging need or has a server error. Grouping resource data based on learned and programmed context specific components related to the server to determine a root cause analysis for the server error or the debugging need. An overall solution is then provided to address the server error or debugging need by evaluation a root cause analysis. The overall solution analyzes a plurality of disparate reasons causing the server error or debugging need and providing a single coherent solution based on interconnectivity of the plurality of disparate reasons. The overall solution is updated by obtaining historical data. The historical data relates to previous debugging needs or server errors related to the server. A recommendation is then provided for the server to resolve the error or the debugging need based on the updated overall solution.

BRIEF DESCRIPTION OF THE SEVERAL VIEWS OF THE DRAWINGS

These and other objects, features and advantages of the present invention will become apparent from the following detailed description of illustrative embodiments thereof, which may be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
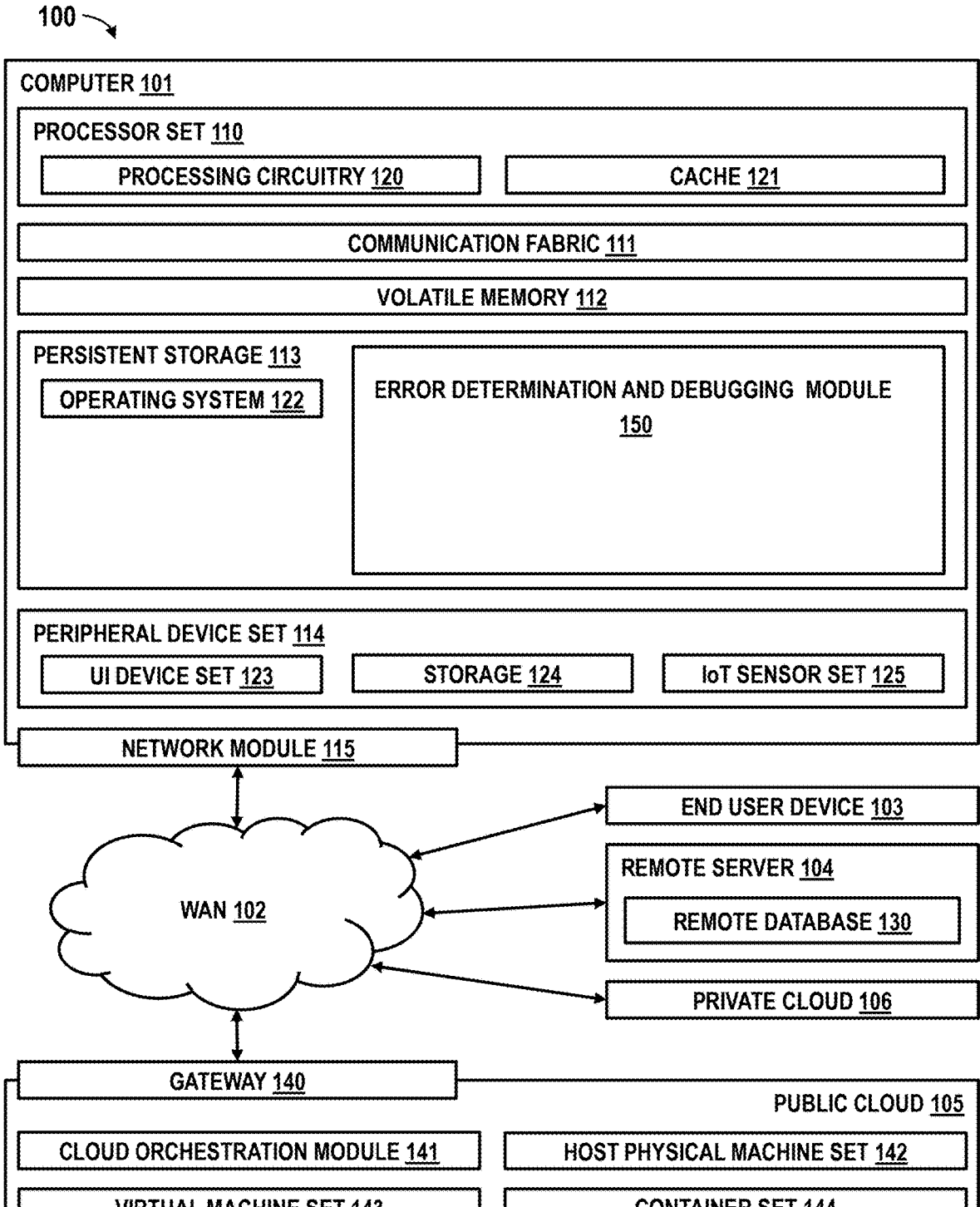
FIG. 1 illustrates a networked computer environment according to at least one embodiment.

Detailed embodiments of the claimed structures and methods may be disclosed herein; however, it can be understood that the disclosed embodiments may be merely illustrative of the claimed structures and methods that may be embodied in various forms. This invention may, however, be embodied in many different forms and should not be construed as limited to the exemplary embodiments set forth herein. Rather, these exemplary embodiments may be provided so that this disclosure will be thorough and complete and will fully convey the scope of this invention to those skilled in the art. In the description, details of well-known features and techniques may be omitted to avoid unnecessarily obscuring the presented embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 1 provides a block diagram of a computing environment 100. The computing environment 100 contains an example of an environment for the execution of at least some of the computer code involved in performing the inventive methods, such as code change differentiator which is capable of providing An Error Determination and Debugging Module (150). In addition to this block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 of FIG. 1 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
FIG. 2 provides an operational flowchart for a process involving automated debugging and root cause analysis of server errors, according to one embodiment.
Figure 2:
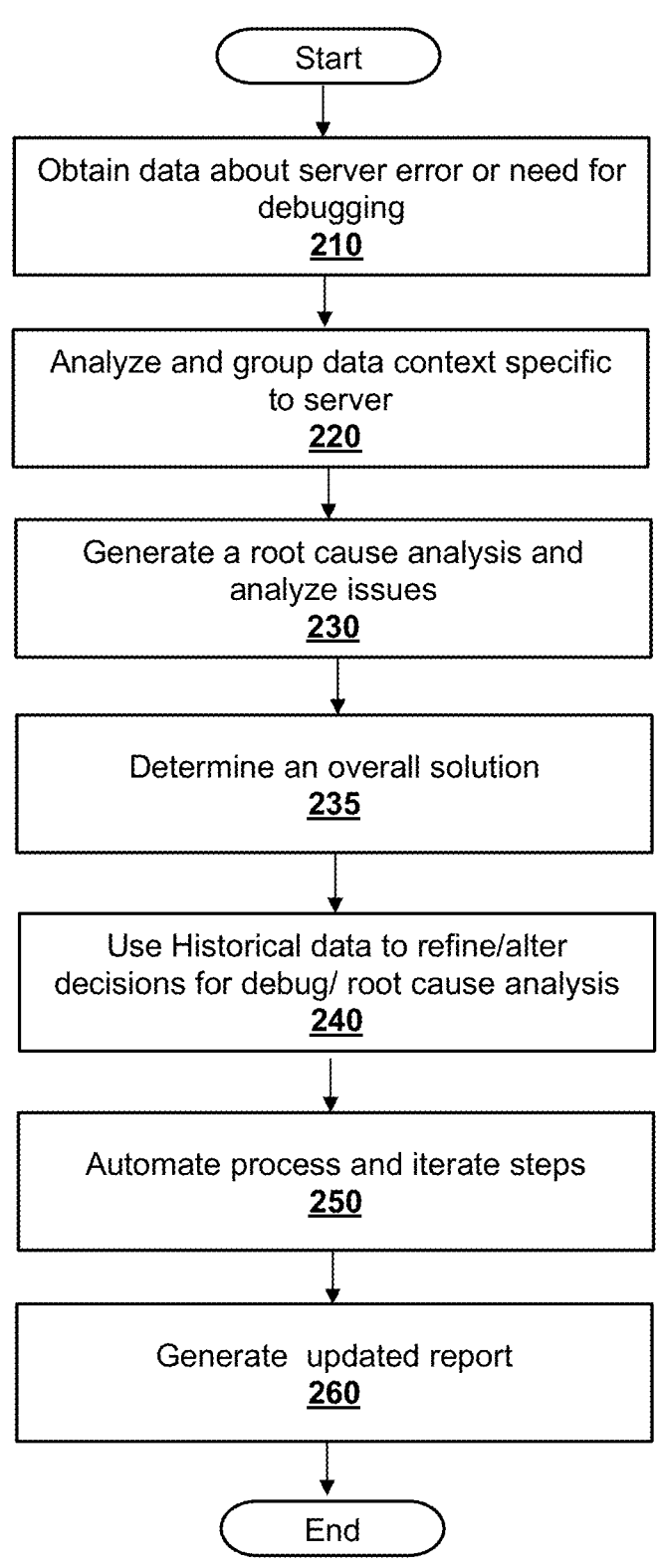

As explained earlier, when a server fails for various hardware or software issues, in addition to the effects of the failure (system crash, reset/reboot, hang, dump, function failed, etc.), an error log is typically recorded to provide the user with additional information about the failure. In many instances, however, error reporting is typically performed in a vacuum. In other words, each event is treated separately and as unrelated to surrounding events regardless of any potential underlying connections or events happening within the same time frame. Errors can be promoted to a higher level (informational→recoverable→unrecoverable) usually by a threshold mechanism, but this does not consider user actions or changes to the system as part of the debug process. Root cause analysis is time-consuming and expensive and can result in good parts being replaced as part of the process due to vagueness and variance in error reporting. In addition, error codes and error logs that are associated with server hardware and software failures are often do not provide sufficient accuracy in providing the reason for the failure. FIG. 2 provides one embodiment that can perform an improved debugging process 200.

In one embodiment, the process 200 (enterprise systems in this example) can provide an on-site technical support that may narrow down root cause based on a combination of error logs, prior experience, and known failure paths. In another embodiment, for systems without on-site support, the system owner must rely more heavily on the error codes and error logs to diagnose the problem alone or asynchronously with online support. The process 200 can then provide debug and root cause analysis of a server error that is extensive, persistent, and self-learning. Process 200 considers errors and events across the entire system rather than looking at each event in isolation (in a vacuum). If events could be related by an underlying component, code path, or mechanism, that information will be considered during the debug process and in the root cause analysis. Process 200 is persistent in that it uses historical data to perform root cause analysis rather than just data from the current error or event. In one embodiment, this can include historical data such as earlier error logs and events, completed prior debug steps, and even previous root cause analyses. Process 200 is self-learning in that it will decide the next steps in the debug process based on prior decisions made, actions that have been taken, and the results. The process learns through a mix of user feedback and automated system scanning to detect changes in both hardware and software.

FIG. 2 provides a flowchart depiction of the process 200 for providing an automated technique in debugging and root cause analysis of server errors that is extensive, persistent, and self-learning. In one embodiment, a self-learning Artificial Intelligence (AI) engine can be used to automate the process 200 using one or more machine learning models.

In Step 210, information about a failed error is collected from a plurality of resources. In one embodiment, the error may be caused by a server. The server may be local, or alternatively remote or be part of a network or even a cloud. Therefore, it is important when there are a variety of servers available, to determine a particular source of the error. In addition, process 200 can be provided offline (run offline) without network connectivity or as part of an on-site service package for issues involving network outages.

In Step 220, the obtained data relating to the error collected from the resources are then analyzed and grouped together in a variety of categories based on context and information specific to the server that caused the error. In certain embodiments, especially when an AI is used, this grouping and analysis may be based on a variety of learned and programmed content to determine context.

In Step 230, a root cause of server error or debugging need is determined. The error may be caused by a plurality of issues, each having a different cause and a different solution. These issues are analyzed together.

In Step 235, an overall solution is provided as a result of the analysis of the root cause determination. The overall solution is provided not by analyzing the issues separately but rather by not considering the issues having disparate causes but rather to look at them to see if there is an interconnectivity between these seemingly plurality of disparate reasons. The overall (holistic) solution considers all the reasons causing the error/debugging need and may be very different than any of the reasons independently.

For ease of understanding for Step 235 and 230, lets consider a first issue, referenced as error 1, may be caused by reason A and a solution of A1 that can cure it. At the same time, a second issue, referenced as error 2 may be caused by B and a solution of B1 can cure it. However, when analyzed together as opposed to separately, it becomes obvious that the error 1 and error 2 are interconnected and not caused independently. In fact, implementing solution A1 and A2 does not permanently resolve the main reason for the appropriate server issue. However, taking these issues together (holistically) will lead to a different solution C1 that will permanently cure both error 1 and error 2 because it assess the real reason for these errors. Error 1 and error 2 are symptoms of a bigger issue that can only be cured permanently through solution C1.

In this way, the process 200, groups and analyzes server errors (and debugging needs) together (holistically) rather than individually based on learned and programmed context specific to that server or server family. In Step 240, in one embodiment, the process 200 may use historical data and input to refine and alter decisions in performing debug and root cause analysis. In one embodiment, this can provide an automated complex decision-making that cannot easily even be made by human support teams.

In one embodiment, by comparing the new error against other concurrent or historical errors, associations may be found that would otherwise appear independent. For example, 2 errors that occur within seconds of each other but on different memory, such as dual in-line memory modules (DIMMs), may point to a memory controller issue rather than individual DIMM issues. In Step 250, the process 200 can iterate debug steps and root cause analysis using prior completed debugging steps.

In one embodiment, as part of the debugging process, users will naturally try different ideas or suggestions to narrow down the root cause of an issue. This may include measures such as updating code levels or swapping/removing hardware to isolate failures. The disclosure considers user inputs and actions by allowing users a method to specify what actions have taken place so that they may be considered in the root cause analysis. For example, if a user swaps the 2 DIMMs throwing errors under Memory Controller 1 (MC1) with DIMMs under MC2 that are not currently throwing errors, the process will take this into consideration for future debug suggestions. If the errors follow the DIMMs it will yield a different root cause analysis than if the errors follow the memory controller.

Figure 3:
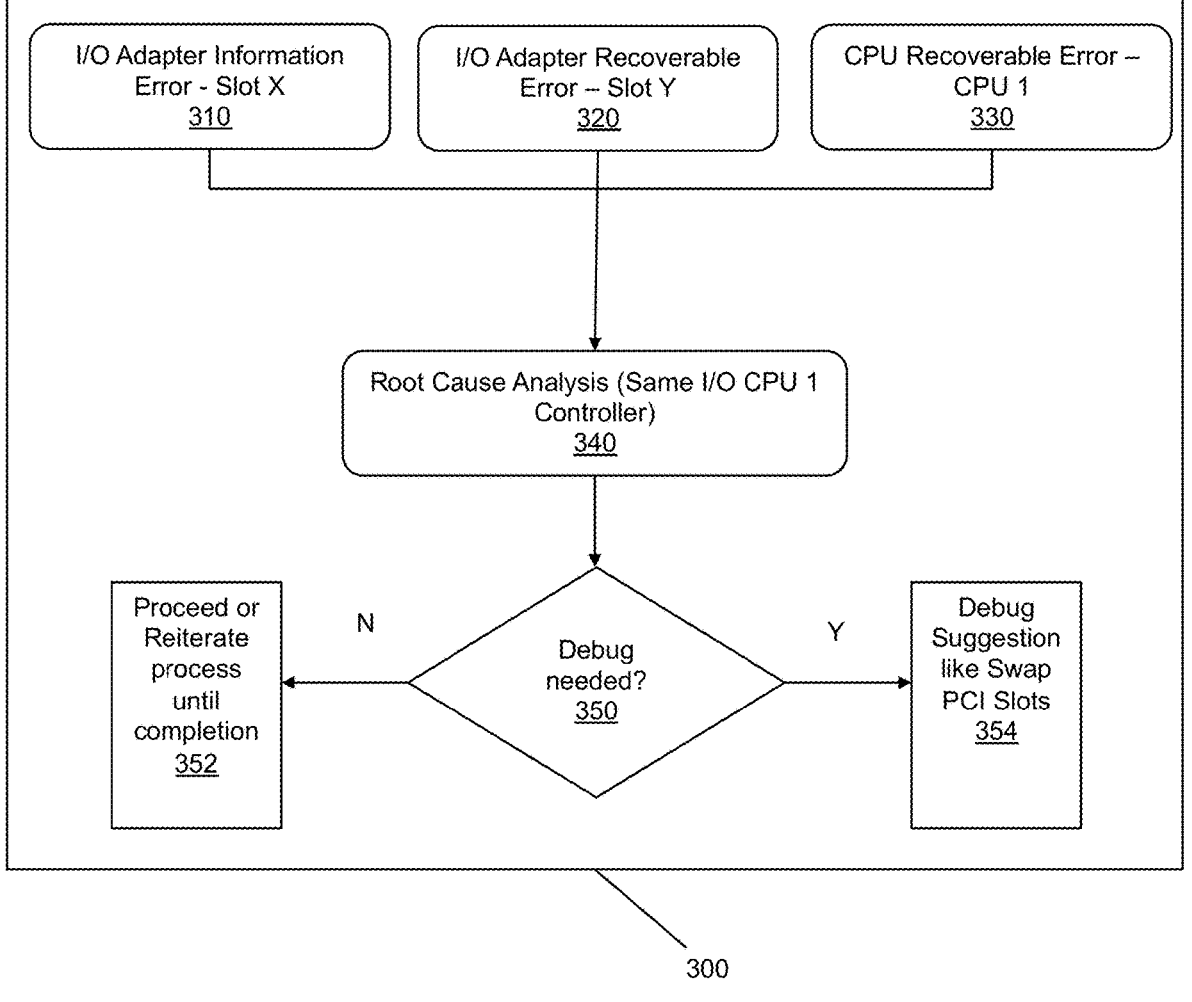
FIG. 3 provides a flowchart depiction of an example handling extensive errors, according to one embodiment.
Figure 4:
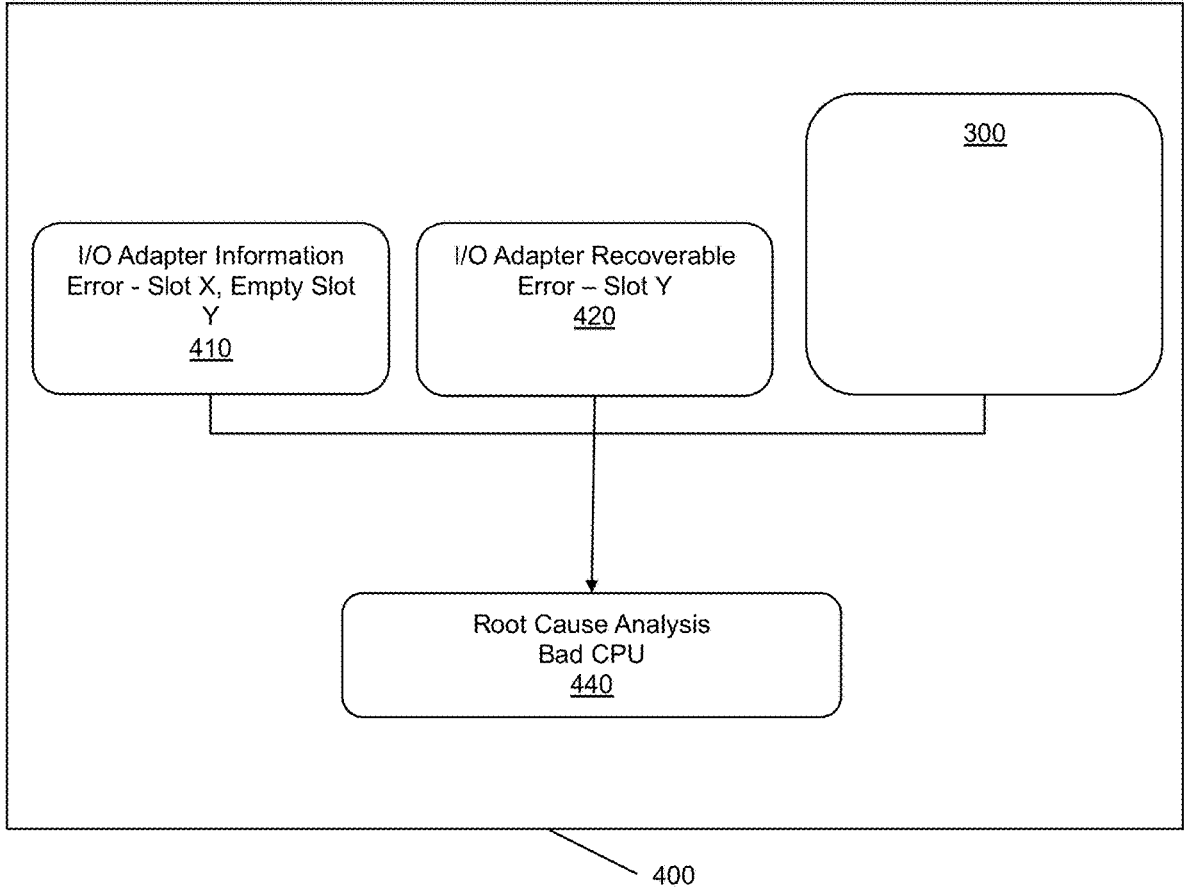
FIG. 4 provides a flowchart depiction of an example handling persistent errors, according to one embodiment.

In one embodiment, real-time system scans are also considered for debug and root cause analysis to cover changes in the system that were not user-initiated as part of the debug process. For example, if a system is throwing errors during IPL after updating code but was not seeing those errors before the code update, the disclosed process would suggest that difference as a potential factor during root cause analysis for the current errors. FIGS. 3-4 as will be discussed to provide more details regarding root cause analysis and debugging suggestions.

In Step 260, a report can be generated to provide necessary debug steps and root cause analysis. In one embodiment, the report can be provided to a user. User recommendations can also be received and the process 200 upgraded to include any such recommendation. In one embodiment, the report can also be updated to include automated and/or user-provided results feedback.

In one embodiment, the process 200 can take advantage of existing error logging and event detection capabilities in a server and enhances them through a process that adds comparative analysis and insight. When a new error or event is detected and logged, the error will be assessed against previous and concurrent errors logged, previous user inputs or actions, and real-time system scans to present the user with a course of action to debug the issue and find root cause.

FIG. 3 provides an example of a system experiencing an extensive error. This example incorporates the root cause analysis and debugging techniques of FIG. 2. In this example two Input-output (I/O) adapters 310 is either experiencing or being debugged to determine if an information error is present in slot X. Similarly, I/O adapter 320, was being checked or experiencing a recoverable error in slot Y. A central processing unit (330) is also experiencing (or being checked) for a recoverable error in CPU 1.

In Step 340, an extensive Root Cause Analysis (RCA) is performed across the entire network having one or more servers-taking into account all errors or possible debug issues as discussed in 310-330.

In Step 350, it is determined whether debugging is needed and if it is needed based on detected errors (steps 310-340), Debug Suggestion are provided in Step 354 based on the RCA to swap the I/O Adapters in Slots X and Y to PCIe slots that are not controlled by CPU 1. Otherwise, the process is continued or steps reiterated until completion as shown in Step 352.

FIG. 4 provides a different example showing a flowchart of a process that handles a Persistent Error. Historical input from extensive error handling of FIG. 3 is incorporated as will be discussed.

In Step 410, a New I/O Adapter is provided in Slot X that is detecting Information Errors while the empty Slot Y has no errors. In Step 420, the CPU 1 is still seeing the same persistent Recoverable Errors that was previously shown in FIG. 3. The Historical RCA is performed and reviewed (Box 300) in the previous step along with the user input results of that suggestion, i.e., the new adapter and slot locations, are used as persistent input for the new RCA.

In Step 440, a new RCA is performed using persistent data from the recurring errors, historical RCA, and user input and determines that the most likely root cause is that CPU 1 is bad.

Figure 5:
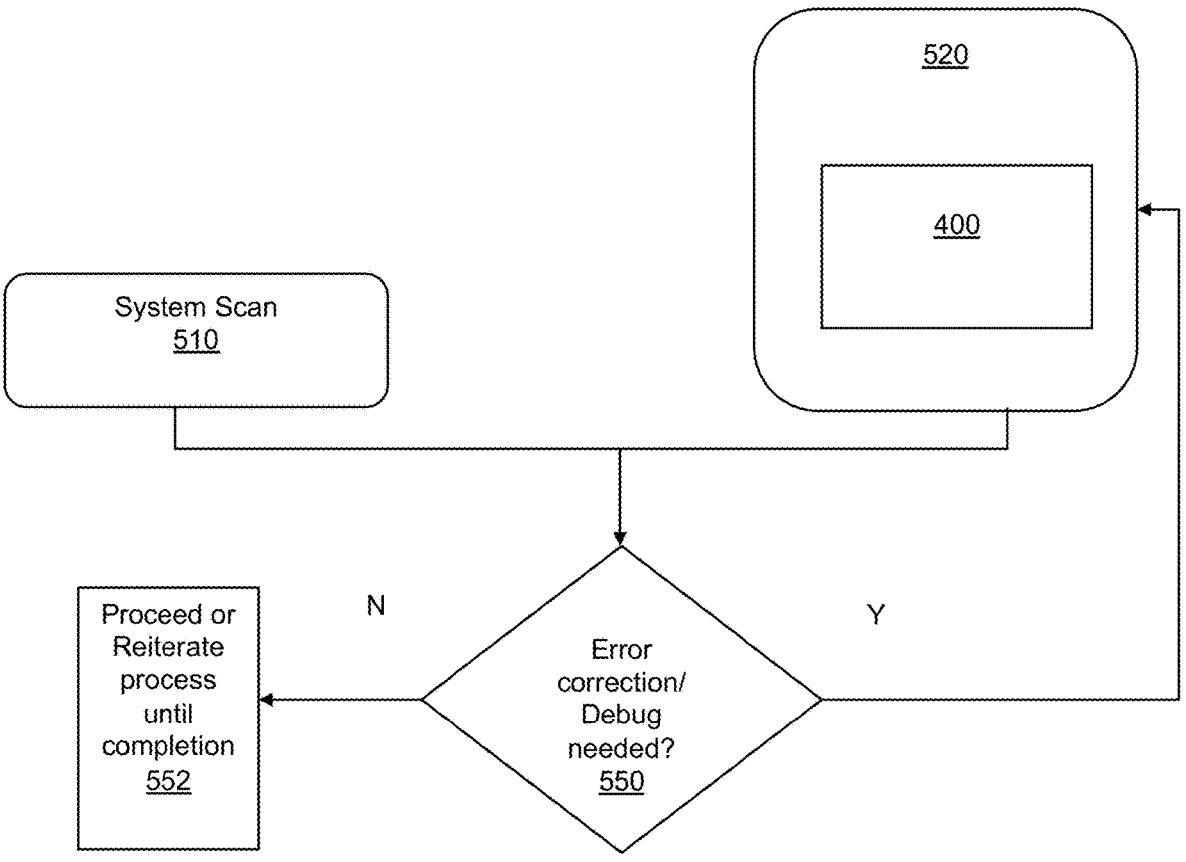
FIG. 5 is a flowchart depiction of a self-learning system for error handling and debugging, according to one embodiment.

FIG. 5 provides a flowchart of a self-learning system used for debugging and error detection as per FIG. 2. In this example, a real-time system scan of the current hardware and software configuration can be provided as shown in Step 510. This scan notes any changes that can be used as input for further analysis.

In Step 520, the latest completed RCA from previous steps is used recursively to further debug and diagnose the issue. Step 520 provides the problems as discussed in FIG. 4 (and FIG. 3—both historical data incorporated) that already has the error situation of FIG. 3 embedded in it.

In Step 550, the disclosed process suggests next steps based on all current data including the most recent RCA. In this case, the suggestion is to replace the bad CPU and clear the affected PCIe slots in the meantime. If further related errors are seen, the user actions taken from this suggestion will help the model learn and suggest a new solution in the future. This is fed to 520 and is used iteratively to further make debug changes. Otherwise, if no further changes need to be made (the process is reiterated) in 552 the process moves to completion.

In one embodiment, the process 200 as further discussed in conjunction with FIGS. 3-5, provide an automated process to aid in debugging and root cause analysis of server errors that is extensive, persistent, and self-learning. The process (200) has the ability to group and analyze server errors together as a whole and provide an overall solution (also referenced as holistically) rather than individually based on learned and programmed context specific to that server or server family. The process can also use historical data and input to refine and alter decisions in its debug steps and root cause analysis. In addition, the process has the ability to iterate debug steps and root cause analysis using prior completed debug steps and root cause analysis with automated or user-provided results feedback.

There are many advantages associated with implementing process 200. For example, there are cost savings associated with fewer support tickets for field issues and less PE involvement required. In addition, there are a reduced number of good parts being replaced. This leads to revenue increase potentials from the augmented sales of low-end systems due to better troubleshooting and root cause analysis of these systems.

The descriptions of the various embodiments of the present invention have been presented for purposes of illustration but may be not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for debugging and providing root cause analysis of server errors, comprising:

obtaining a plurality of resource data related to a server, wherein said server either has a debugging need or has a server error;

grouping said plurality of resource data based on learned and programmed context specific to said server;

generating a root cause analysis by determining and evaluating a plurality of issues causing said debugging need or said server error, wherein said plurality of issues are disparate and said root cause analysis determines interconnectivity of said plurality of issues;

providing an overall solution based on said root cause analysis; wherein said overall solution provides said overall solution based on interconnectivity of said plurality of issues;

updating said overall solution by obtaining a plurality of historical data, wherein said historical data relates to previous debugging needs or server errors related to said server;

analyzing a plurality of debugging steps iteratively to find a root causes reason before providing a feedback;

providing a recommendation to a user based on said feedback, for resolving said server error or debugging need based on said updated overall solution; and restoring server based on recommendation for resolving said server error and debugging it based on any need for said updated overall solution.

2. The method of claim 1, wherein said recommendation and historical data are stored in a database.

3. The method of claim 2, wherein said historical data also relates to solutions provided for similar server errors or debugging needs on other servers.

4. The method of claim 1, wherein said recommendation is provided by a self-learning artificial intelligence (AI) engine.

5. The method of claim 4, wherein recommendation and historical data are stored in a database and used by the AI engine to reiteratively automate providing a future solution to other debugging and/or server errors.

6. The method of claim 1, further comprising generating a report to a user relating to said recommendation.

7. The method of claim 6, herein user provided feedback and received and incorporated in an updated recommendation.

8. The method of claim 1, wherein said recommendation is performed by said server.

9. The method of claim 1, wherein said server is a part of a computer network having a plurality of other servers and resource data is grouped based on server family.

10. The method of claim 1, wherein said server errors can be extensive or persistent.

11. A computer system for debugging and providing root cause analysis of server errors, comprising:

one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is enabled to perform following steps:

obtaining a plurality of resource data related to a server, wherein said server either has a debugging need or has a server error;

grouping said plurality of resource data based on learned and programmed context specific to said server;

generating a root cause analysis by determining and evaluating a plurality of issues causing said debugging need or said server error, wherein said plurality of issues are disparate and said root cause analysis determines interconnectivity of said plurality of issues;

providing an overall solution based on said root cause analysis; wherein said overall solution provides said overall solution based on interconnectivity of said plurality of issues;

updating said overall solution by obtaining a plurality of historical data, wherein said historical data relates to previous debugging needs or server errors related to said server;

analyzing a plurality of debugging steps iteratively to find a root causes reason before providing a feedback;

providing a recommendation to a user based on said feedback, for resolving said server error or debugging need based on said updated overall solution; and restoring server based on recommendation for resolving said server error and debugging it based on any need for said updated overall solution.

12. The computer system of claim 11, wherein said recommendation is provided by a self-learning artificial intelligence (AI) engine.

13. The computer system of claim 12, wherein said recommendation and historical data are stored in a database and used by the AI engine to reiteratively automate providing a future solution to other debugging and/or server errors.

14. The computer system of claim 11, further comprising generating a report to a user including said recommendation.

15. The computer system of claim 14, wherein user provided feedback and received is incorporated in an updated recommendation.

16. The computer system of claim 11, wherein said recommendation is performed by said server.

17. The computer system of claim 11, wherein said server errors can be extensive or persistent.

18. A computer program product for debugging and providing root cause analysis of server errors, comprising:

one or more computer-readable storage medium and program instructions stored on at least one or more tangible storage medium, the program instructions executable by a processor, the program instructions comprising:

program instructions to obtain a plurality of resource data related to a server, wherein said server either has a debugging need or has a server error;

program instructions to group said plurality of resource data based on learned and programmed context specific components related to said server;

program instructions to generate a root cause analysis by determining and evaluating a plurality of issues causing said debugging need or said server error, wherein said plurality of issues are disparate and said root cause analysis determines interconnectivity of said plurality of issues;

program instructions to provide an overall solution based on said root cause analysis; wherein said overall solution provides said overall solution based on interconnectivity of said plurality of issues;

program instructions to update said overall solution by obtaining a plurality of historical data, wherein said historical data relates to previous debugging needs or server errors related to said server;

program instructions to analyze a plurality of debugging steps iteratively to find a root causes reason before providing a feedback;

program instructions to provide providing a recommendation to a user based on said feedback, for resolving said server error or debugging need based on said updated overall solution; and program instructions to restore server based on recommendation for resolving said server error and debugging it based on any need for said updated overall solution.

19. The computer program product of claim 18, wherein said recommendation is provided by a self-learning artificial intelligence (AI) engine.

20. The computer program product of claim 19, wherein said recommendation and historical data are stored in a database and used by the AI engine to reiteratively automate providing a future solution to other debugging and/or server errors.

* * * * *